B. P. HAYES.
TELEGRAPH TRANSMITTER.
APPLICATION FILED MAY 17, 1910.
990,485.
Patented Apr. 25, 1911.
8 SHEETS—SHEET 1.
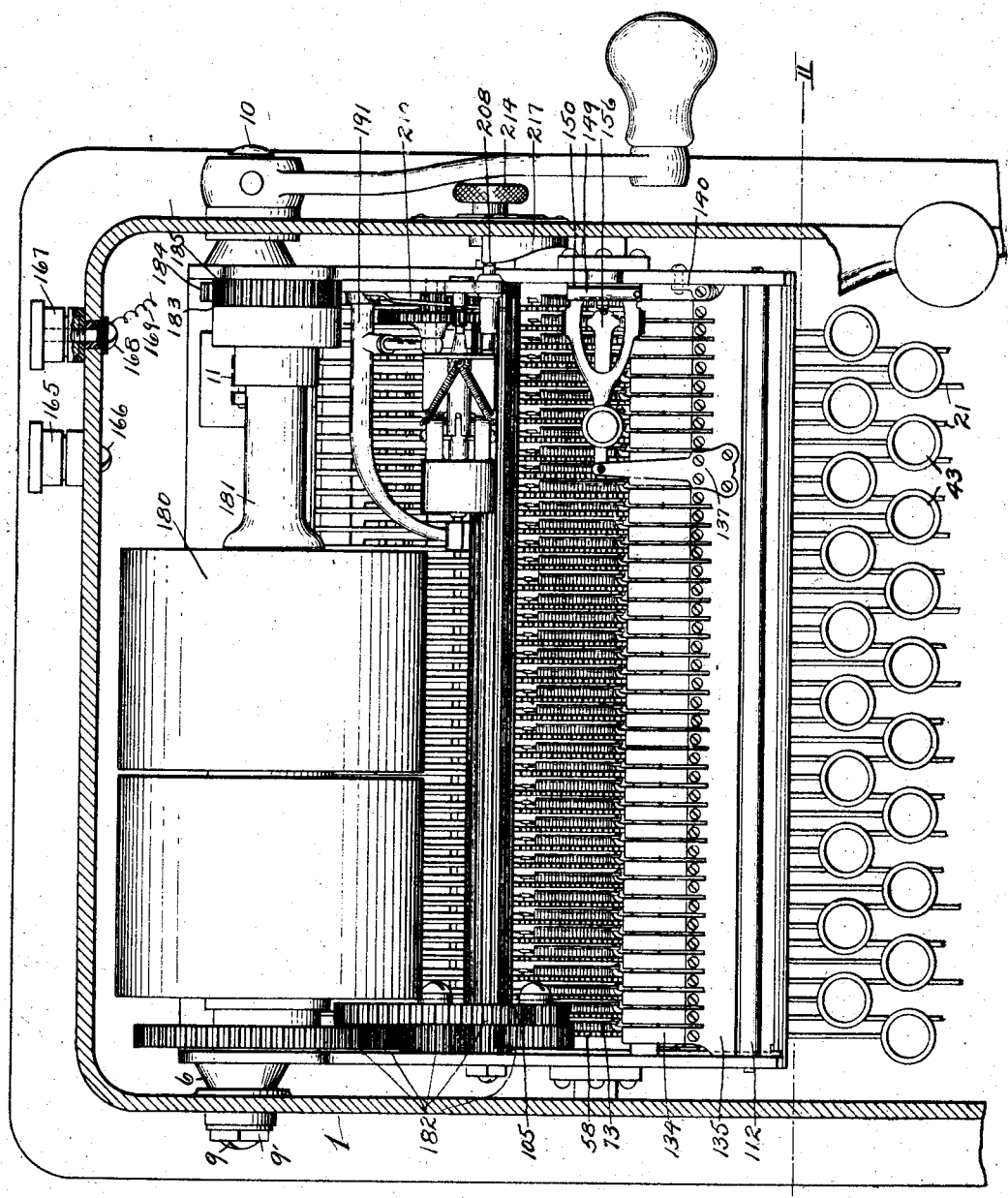
Fig. I.
WITNESSES:
E. A. Cahill
Myrtle M. Jackson
INVENTOR.
Benj. P. Hayes.
BY Arthur C. Brown
ATTORNEY.

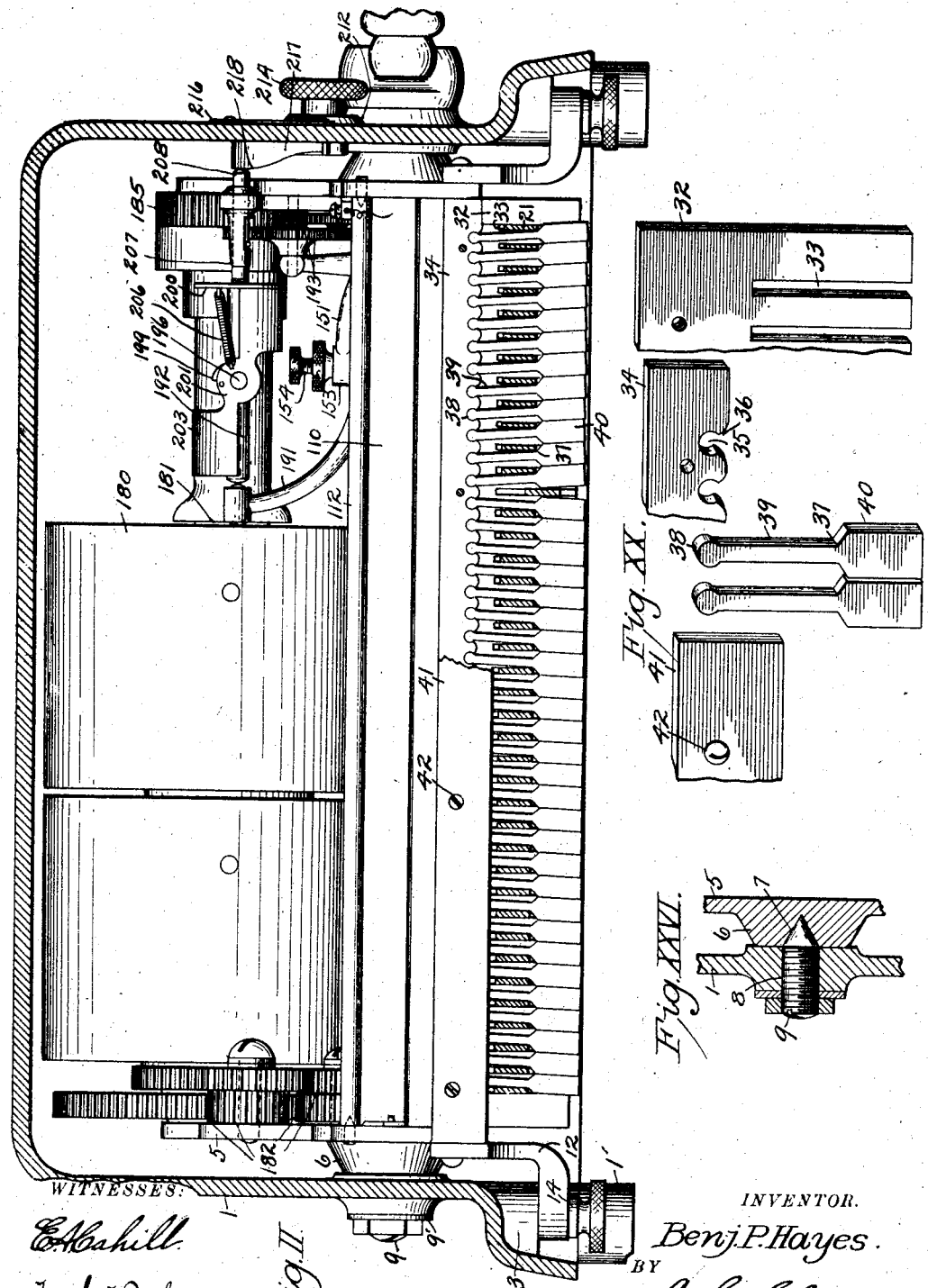

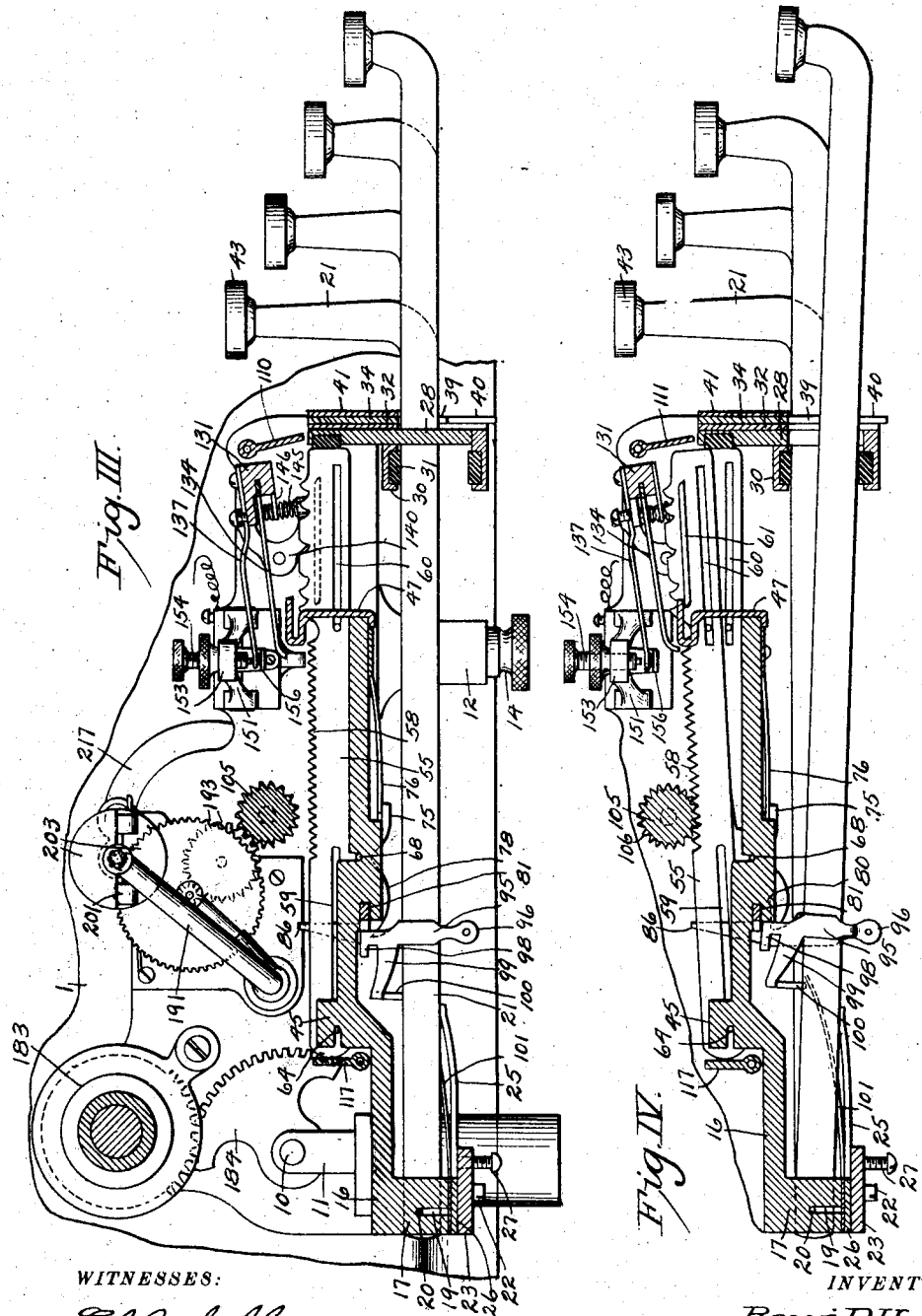

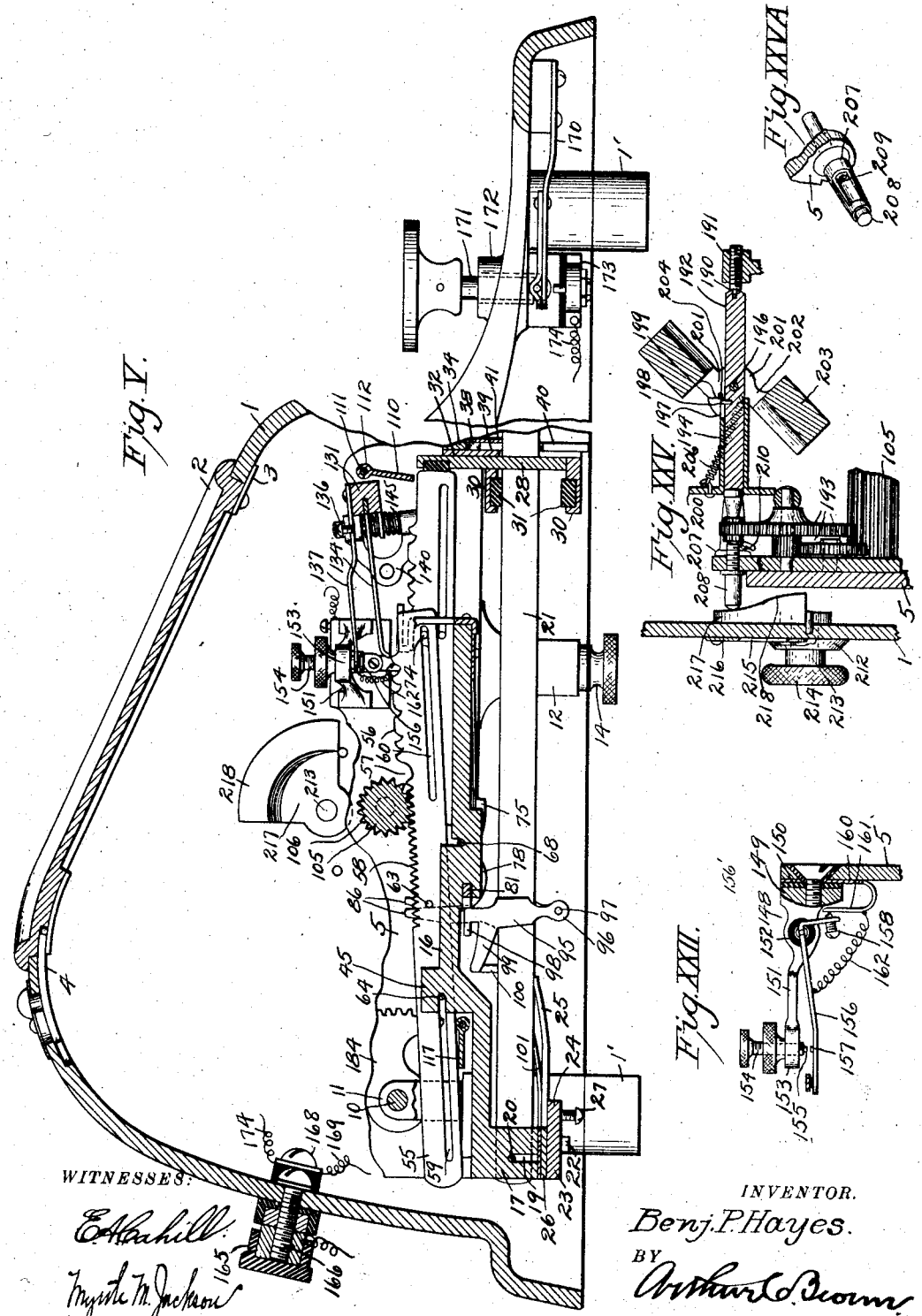

B. P. HAYES.
TELEGRAPH TRANSMITTER.
APPLICATION FILED MAY 17, 1910.
990,485.
Patented Apr. 25, 1911.
3 SHEETS—SHEET 5.
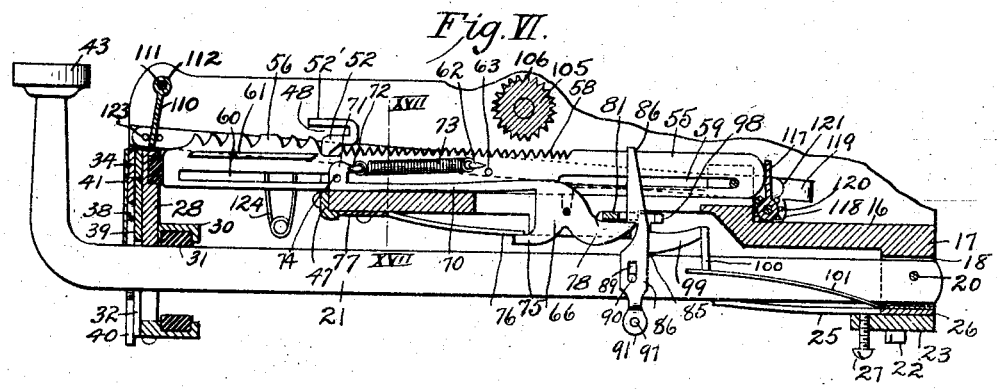
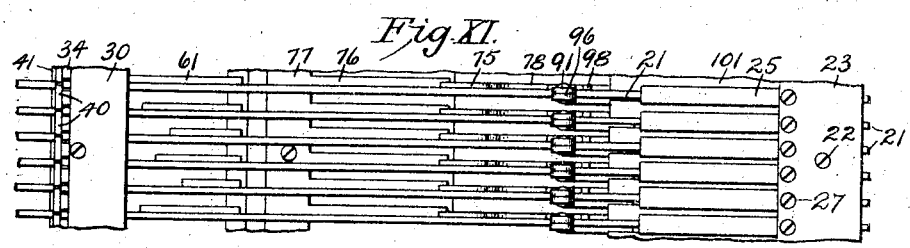
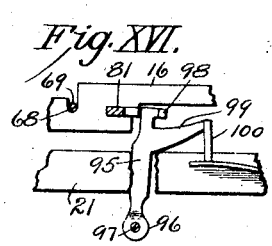
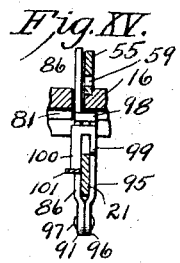
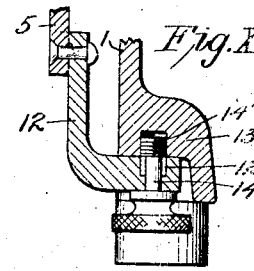
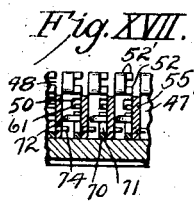
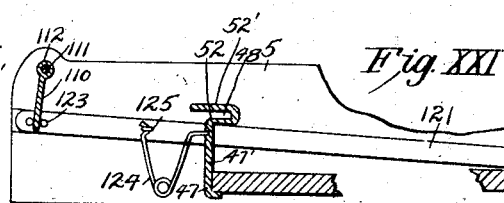
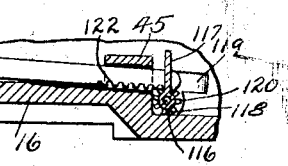
WITNESSES:
INVENTOR.
Benj. P. Hayes.
BY
Arthur Brown
ATTORNEY.
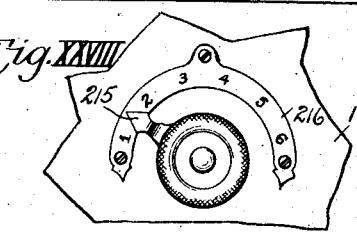

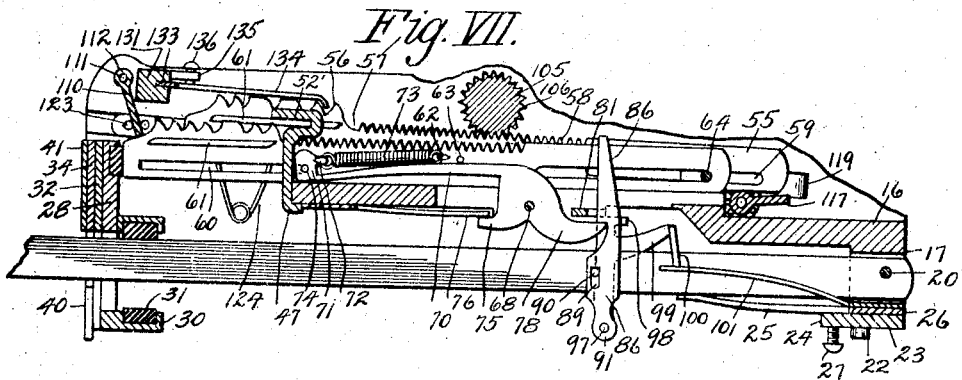

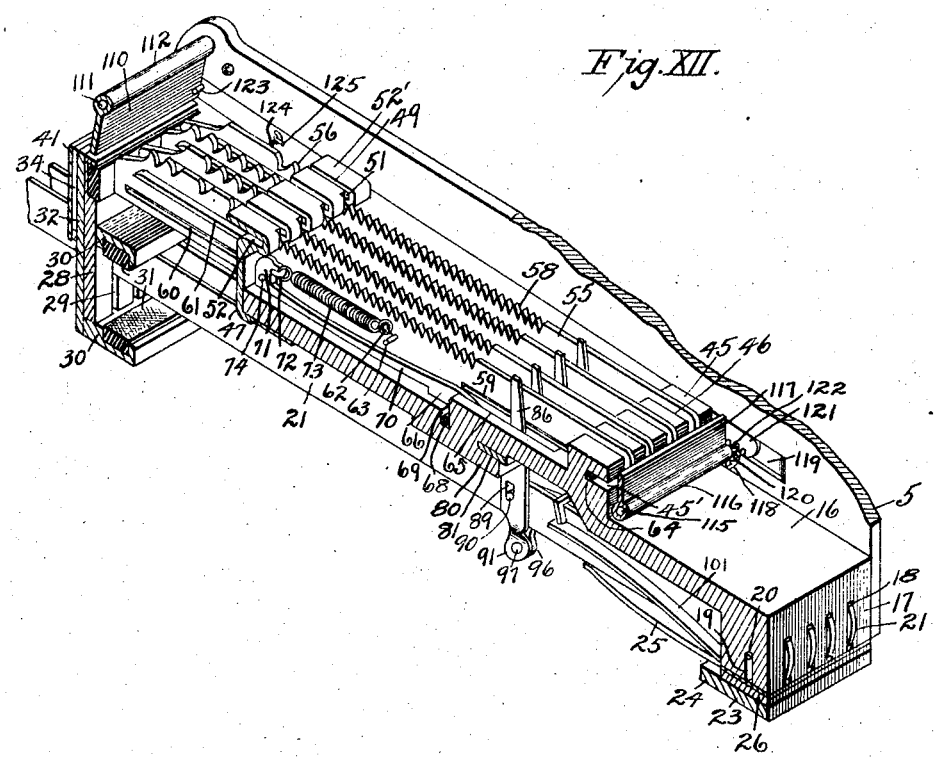
Fig. XII.
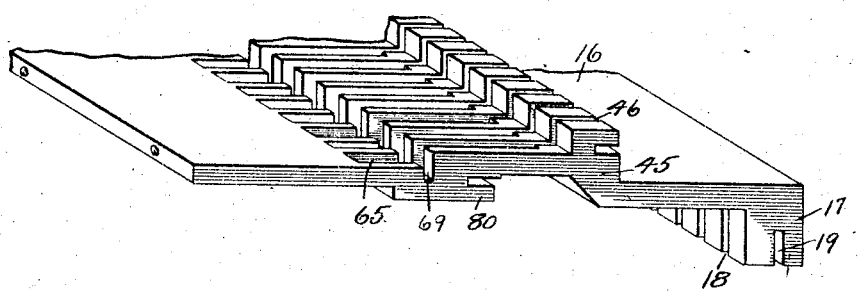
Fig. XIII.

B. P. HAYES.
TELEGRAPH TRANSMITTER.
APPLICATION FILED MAY 17, 1910.
990,485.
Patented Apr. 25, 1911.
8 SHEETS—SHEET 8.
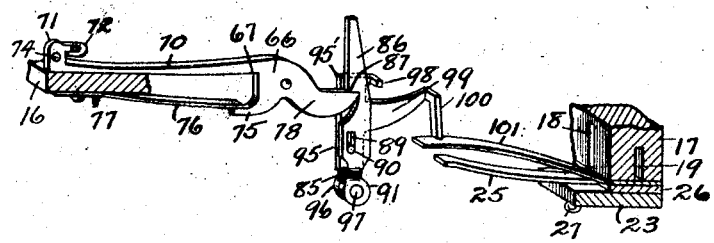
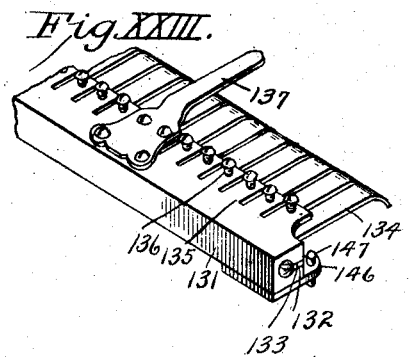
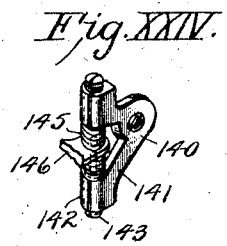
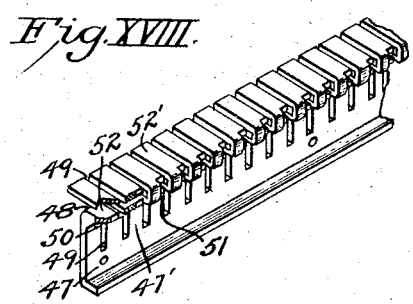
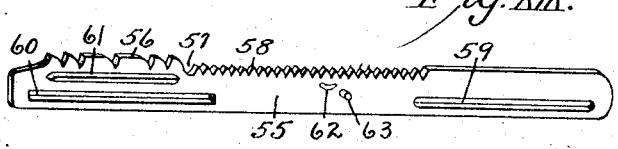
WITNESSES:
INVENTOR.
Benj. P. Hayes.
BY
Arthur C. Brown
ATTORNEY.

UNITED STATES PATENT OFFICE.

BENJAMIN P. HAYES, OF TOPEKA, KANSAS, ASSIGNOR TO THE AMERICAN TRANSMITTER AND MANUFACTURING COMPANY, OF TOPEKA, KANSAS, A CORPORATION OF KANSAS.

TELEGRAPH-TRANSMITTER.

990,485.     Specification of Letters Patent.     Patented Apr. 25, 1911.

Application filed May 17, 1910. Serial No. 561,789.

*To all whom it may concern:*

Be it known that I, BENJAMIN P. HAYES, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters and more particularly to a device of a class known as keyboard transmitters.

It is the principal object of my invention to provide a transmitter comprising a single circuit closer, a motor, a plurality of individually operative character members, each of which is representative of an individual character or symbol and is adapted for actuating the telegraph key, together with a keyboard, the members of which are adapted for releasing relative character or symbol members to the control of the motor.

It is a further object of my invention to improve and simplify the machine parts and to combine such parts in a manner to provide a complete mechanism which is simple and accurate in operation.

A further object of my invention is to provide a transmitter which is cumulative in its operation, in order that, should a succeeding character device be released before a previous device has completed its operation, the last character device to be released will become set and will operate only when the previous device has completed its operation.

It is a further object of my invention to provide a locking mechanism for preventing simultaneous operation of two or more of the character devices and a consequent confusion of transmission.

It is a further object of my invention to provide a stop mechanism for preventing the simultaneous actuation of two or more of the keyboard members.

Other objects of my invention are disclosed in the following description, wherein reference is made to the accompanying drawings, in which:—

Figure I is a plan view of the working parts of a telegraph transmitter constructed according to my invention, the case being in section and only a part of the keyboard illustrated. Fig. II is a front view of same, the base and keyboard members being sectioned in the line II—II, Fig. I. Fig. III is a front to back vertical section of the working parts looking in the direction of the governor and circuit closer, and showing the character members in inert position. Fig. IV is a similar view of the letter keys and character devices showing one of the latter in initial released position. Fig. V is a similar view, showing the character device at the end of its back stroke and including parts of the case, the telegraph key and the governor brake. Fig. VI is a detail view of a letter key and character device looking from the side opposite that of the previous views, the parts being in inert position. Fig. VII is a similar view, showing an inner character device in operative position and the outer bar in set or cumulative position. Fig. VIII is an enlarged detail view of one of the character bars and the slotted guide plates through which it travels; the bar being broken away and illustrated in its normal or inert position. Fig. IX is a similar view, showing the bar in operating position. Fig. X is a similar view, showing the parts in returning position. Fig. XI is a bottom plan view of a number of letter keys and character devices. Fig. XII is a perspective view of a portion of the inner frame, showing character bars, locking mechanism, triggers and key levers. Fig. XIII is a perspective view of a portion of the inner frame. Fig. XIV is an enlarged perspective view of one of the controlling arms, a trigger, and the trigger springs, the letter key lever being omitted. Fig. XV is an edge view of one of the triggers and the parts with which it is immediately connected. Fig. XVI is a detail view of one of the trigger levers, showing its association with the character device frame and letter key lever. Fig. XVII is a cross section on the line XVII—XVII, Fig. VI, the springs being omitted to more clearly illustrate the slide heads. Fig. XVIII is a perspective view of the character bar guide plate. Fig. XIX is a similar view of one of the character bars. Fig. XX is a perspective view of the key lever locking parts, in their relative order. Fig. XXI is a detail view of the character device buffers and connecting pitman. Fig. XXII is a detail view of the circuit closer. Fig. XXIII is an enlarged perspective view of the brush parts. Fig. XXIV is a similar view of the buffer controlling the brush beam. Fig. XXV is a sectional view of the governor. Fig. XXV^A is a detail view of the governor friction pin. Fig. XXVI is a detail view of the cone mounting by which the frame is connected with one side of the case. Fig. XXVII is a vertical section of the case and frame connecting parts. Fig. XXVIII is a side view of the case, showing the governor cam indicator.

Referring more in detail to the parts:— 1 designates the case within which the operative parts of the machine are contained, its forward portion being extended to inclose the keyboard and having an opening through which the keyboard is exposed.

In the upper portion of the case body, (Fig. V) is an opening through which access may be had to the machine parts; such opening being provided with a cover 2 having lugs 3, at its lower edge, adapted for projection beneath the cover body, and having a socket at its opposite edge, into which the sliding latch 4 is adapted to project. On the under side of the case are the supporting feet 1', which are preferably formed with rubber caps, as shown.

Within the case are the frame side plates 5. On one of plates 5, near the rear, is a boss 6 (Figs. I and XXVI), having a conical socket 7. In the side of the case 1 adjacent to the frame boss 6 is a threaded aperture 8 that registers with the frame socket. 9 designates a pivot stud which is threaded into aperture 8 and has a conical point adapted for projection into the frame socket. At the opposite side of the frame is a crank pin 10 that is revolubly mounted on the case 1 and bearings, so that the frame and machine parts are pivotally connected to permit the machine parts to swing in the case, and so that the forward portion of the case may be lifted away from the machine to expose the parts for cleaning or repairing. The stud 9 is provided with the nuts 9' for limiting its projection into the boss sockets and retaining same in a set position. Also fixed to the frame sides are legs 12 (Figs. II and XXVII), having offset portions adapted to underlie the case lugs 13, and provided with the shouldered sockets 12'. Extending through each offset leg portion is a thumb screw 14, the shank of which has a head 14' adapted to thread into the case lug and support the frame when the parts are assembled, the head 14' being enlarged so that it will hold against the bottom of socket 12' when disconnected from the case.

Extending between the side plates 5 is a frame 16 (Figs. V–XII and XIII), which carries the character bars, as will presently be more fully described. Depending from the rear portion of frame 16 and preferably integral therewith is a hanger 17, having the downwardly opening front to back slots 18 and a downwardly opening traverse slot 19 that intersects the slots 18. Extending through the slot 19 is a pin 20. Located in the slots 18 and pivotally mounted on pin 20 are the rear ends of the letter key levers 21. Fixed to the under face of hanger 17, by screws 22 is a plate 23, the forward edge of which projects beyond the front face of the hanger 17 to form a shelf 24.

25 designates leaf springs, the forward ends of which frictionally engage the under edges of and yieldingly support the key levers 21; said springs being preferably formed by slotting a single piece of spring metal, the integral head 26 of which extends across the frame beneath the hanger 17 and is secured thereto by the plate 23. Extending through the shelf 24 are the screws 27 which engage the under edges of the springs 25 and by which the tension of said springs may be regulated.

Connecting the side plates 5, at the forward end of the frame, is a guide plate 28, having slots 29 through which the letter key levers 21 are projected.

Supported at upper and lower positions on the plate 28 are the rearwardly projecting horizontal shelves 30, having cushions 31 against which the letter key levers may strike to limit their upward and downward travel.

Fixed to the forward ends of the side plates 5 and to plate 28, is the depending guide plate 32 (Fig. II), having slots 33 through which the key levers 21 are also projected. Attached to plate 32 is a hanger bar 34, which is provided, near its lower edge, with circular sockets 35 having outwardly beveled necks 36 opening through the lower portion of the bar.

Supported on the bar 34 are pendulum keys 37 comprising the round head 38 which seat in the sockets 35, the shanks 39 which project between the letter key levers 21, and the blades 40 which extend beneath the key levers 21 and are adapted for edge contact with each other. The pendulum blades and shanks are of such width that when one of the key levers is depressed it engages the upper beveled edges of the adjacent pendulum blades and moves the latter laterally to allow the lever to move downwardly to the free limit of its travel, the pendulums moving freely in their socket mountings until the shanks of the members contact the key levers at the end of the line, when all of the pendulum blades will be brought into close edge contact and will hold firmly against each other. With one of the levers depressed and the pendulums in the position last described, should it be attempted to depress a second lever, the second lever will be held by the upper beveled edges of the adjacent pendulum blades until the first lever has been released and automatically returned to its normal position by the tension of spring 25, when the pendulums may be spread to close the space previously occupied by the first lever and open a space for the succeeding one. The pendulums are held in position preferably by a plate 41 which has screws 42 extending therethrough, through the bar 34 and slotted plate 32 into the guide plate 28. The outer ends of the key levers are turned upwardly and provided with the character buttons 43.

From the foregoing it is apparent that the key levers will operate as in an ordinary typewriter, but that by reason of the pendulum keys it is impossible for two or more of the levers to be actuated simultaneously.

Referring now to the character members and the mounting therefor:—45 designates a head which rises from the frame 16, near the rear, and has the upwardly opening front to back slots 46. Fixed to the front end of frame 16 and extending between the side plates 5 is a character bar guide plate 47 (Figs. XII and XVIII), the upper edge of which is bent rearwardly and upwardly and then forwardly to provide the horizontal groove 48. At intervals throughout its length, the plate is provided with vertical slots 49, which are the same in number as the slots 18 in the frame hanger 17 and in longitudinal alinement therewith. In one side of each of the plate teeth 47', near the top, is a groove 50 that communicates with a vertical slot 49. At one edge the curved portion of each tooth 47' is cut away to form the recess 51 through which the character bar rib, which will presently be described, may pass after their travel between the shelf 52 and lip 52' of the plate tooth 47'. Slidably mounted in alining slots in the frame head 45, and plate 47, are the character bars 55, which are, except as hereafter specifically mentioned, provided with individual operating parts. Each character bar is provided, at its forward end, with the character teeth 56, which are formed by notching the upper edge of the bar and varying the width of the teeth between the notches so that one tooth may represent a telegraphic dot and another a dash, the teeth being so arranged and combined on the various bars that each bar may represent a distinct letter or character in the telegraphic code. In each character bar is an initial notch 57 (Fig. XIX), that is deeper than the teeth notches, so that the brushes, to be presently described, may project thereinto when the parts are stationary. On the upper edge of each character bar, back of the character teeth are the rack teeth 58. In each character bar and extending forwardly from near the rear end thereof is a slot 59, and extending rearwardly from near the front end thereof is a slot 60. Extending laterally from one side of the bar, above the slot 60, and below the character teeth, is a rib 61 which is of substantially the same length as the notched portion of the bar and the ends of which are preferably pointed, as shown in Fig. XIX. From near the center of the bar, on the side on which the rib 61 is located, is a hook 62 and a tripping pin 63, the pin being slightly to the rear of the hook. Fixed in the head 45 and extending through the rear slot 59 in each character bar is a pin 64 for guiding the travel of the bars, and upon which said bars may pivot. To facilitate the assembling of the parts, I prefer to provide the head 45 with a rearwardly opening transverse slot 45' and locate the pin 64 therein.

In the body portion of frame 16 are the vertical slots 65 which are equal in number to the slots 29 and 46 in the plate 28 and head 45. Located in each of the slots 65 is the head 66 of a controlling arm which I will designate, as a whole, by the numeral 67 (Figs. XII and XIV); the heads being pivotally mounted, preferably on a pin 68 that extends entirely across the frame 16 and is seated in a transverse slot 69 therein. On the upper portion of the head 66 is a spring arm 70 that projects forwardly alongside of one of the character bars and has a lug 71, at its free end, provided with a hook 72.

73 designates a spring, the forward end of which is connected with the hook 72 and the rear end of which is connected with the hook 62 on the adjacent character bar and yieldingly retains said bar in its forward position.

74 designates a pin that projects laterally from the lug 71 into the forward slot 60 in the adjacent character bar. Projecting forwardly from the controlling arm head 66, beneath the spring portion 70 is a lug 75. Fixed to the under side of the frame 16 is a leaf spring 76 which engages the upper face of the lug 75 and yieldingly retains the forward portion of the head 66 and controlling arm 70 in a lowered position, spring 76 being preferably formed from a plate of spring metal, the head 77 of which extends entirely across the frame and is slit to provide the several leaf members 76.

On the head 66 is a downwardly offset rearwardly projecting trigger tooth 78. On the under side of frame 16 is a rearwardly projecting shelf 80, upon which is seated a bar 81 that projects entirely across the frame above the trigger teeth 78, to form latch stops within the slots 65, and is provided with notches into which the trigger latches 86 are projected when the trigger is in operative position.

Referring now to the trigger, which I will designate, as a whole, by the numeral 85; 86 designates the controlling arm latch, which extends into a frame slot 65 and is of such height that it may be engaged by the character bar pin 63. Latch 86 has a forward shoulder 87 normally overlaying the trigger tooth 78 of the controlling arm 70, and a body portion extending downwardly over the side of the relative letter key lever 21. In the portion of latch 86 that lies against the face of the key lever is a vertical slot 89, into which a pin 90, that is fixed to the side of lever 21 projects and is adapted to travel, the length of the slot being such that when the key lever is depressed the pin will engage the latch, at the bottom of the slot, and depress the latch. The lower end of the latch is turned under the key lever and provided with a head 91.

95 designates the trigger catch, which lies against the side of the key lever opposite the latch 86 and has an offset lower head 96 pivotally connected with the head of latch 86 by a pin 97. Above the key lever, catch 95 has a head 95' that is adapted for engagement with the under face of bar 81 and a lateral finger 98 that projects behind and is adapted for engagement by the rear edge of latch 86. Projecting rearwardly from catch 95 is an arm 99, having an offset post 100, the under edge of which is adapted for engagement by the free end of a leaf spring 101 that is carried by the shelf plate 23 on the frame hanger 17. The spring 101 is preferably formed from a piece of spring metal that is held between the hanger 17 and shelf plate 23 and is slit to form the individual springs 101. The catch 95 is of such length that when depressed by the key lever and trigger latch its upper face will be moved under the stop bar 81 and will hold the trigger latch and controlling arm in set position, as presently more fully described.

Revolubly mounted in the frame side plates 5 above the frame 16 and character bars is an elongated pinion 105, having sharp teeth 106 adapted to be engaged by the teeth 58 on the character bars when the latter are raised by the key lever and trigger mechanism.

Pivotally mounted on and extending between the side plates 5 is a locking bar 110, which is adapted to swing over the forward ends of the character bars and hold same against elevation by the controlling arm, the pivotal mounting of the bar being preferably effected by means of a rod 111 which is carried by the side plates 5 and extends through a sleeve 112 on the rocking bar, so that the sleeve may turn on the rod.

Extending transversely between the side plates 5, back of the frame head 45 and below the path of the character bars is a rod 115 (Fig. XII).

Pivotally mounted on the rod 115 is a sleeve 116, from which a buffer plate 117 is projected upwardly across the path of the character bars. In the face of the plate 5 at one end of the buffer 117 is a socket 118 and intersecting said socket and extending forwardly past the locking bar 110 is a groove 119. Fixed to the sleeve 116 and located in the socket 118 is a gear wheel 120.

Slidably mounted in the groove 119 is a pitman 121, the under edge of which is provided with the gear teeth 122 which mesh with the teeth of wheel 120. At its forward end, the pitman is provided with the pins 123 which project laterally on opposite sides of the locking bar 110, so that when the pitman is moved forwardly or back, the locking bar will be swung on its pivotal mounting. 124 designates a spring, one arm of which is fixed on the frame 16 and the other connected with a hook 125 on the pitman, so that the latter is yieldingly held in its forward position.

Extending between the side plates 5 and pivotally mounted thereon, is a beam 131. Fixed to beam 131, preferably by inserting same in a groove 132 in the rear face of the beam, is a plate 133. Plate 133 extends rearwardly over the character bars and is split to form the individual brushes 134, each of which is downturned at the end and adapted for engagement with the character teeth on a respective character bar. On the upper portion of beam 131 is a split flange 135, the fingers of which project forwardly over the rear portions of the brushes 134. Threaded into each of the flange leaves, is a screw 136, which projects downwardly into contact with the upper face of a brush 134, in order that the tension of each brush may be adjusted independently of the others.

On the beam 131 and projecting rearwardly over the character bars is a key operating arm 137.

Rigidly mounted on one of the side plates 5, adjacent to the beam 131 is a buffer bracket 140, having yoke arms 141 within the split heads 142 of which are located the screws 143, which terminate between the bracket arms and are surrounded by the coil springs 145 which project beyond the free ends of the screws. Fixed to the beam 131 is an ear 146 that is adapted to project between the buffer arms and has the short upper and lower studs 147 which project into the respective buffer springs to retain same in position against the opposite sides of the beam ear, and are adapted to engage the ends of the buffer pins to positively limit the pivotal movement of the beam. When the beam moves in its pivotal mounting the ear 146 moves against the tension of the springs 145 so that the impact of the ear pins against the buffer pins is broken, to obviate jarring of the machine. It is apparent that the springs 145 will tend to balance the brush beam and return the brush beam to initial position after each operation.

Mounted on one of the side plates 5 is the circuit closer bracket, which I will designate, as a whole, by the numeral 148. The base 149 of said bracket is insulated from the side plate by a mat 150, and has the laterally projecting arms 151, each of which is provided with an insulated bearing 152. Beyond the bushings the arms 151 come together in a head 153, within which a contact pin 154 is adjustably mounted, the lower end of the pin being projected beneath the head and terminating in a point 155. Extending between the arms 151 and revolubly mounted in the bushings 152 is a key arm 156, the forward end of which projects beneath the contact point 155 and has a point 157 adapted for contact therewith, and the rear end of which is down set and provided with a screw 158. Located between the insulation mat 150 and the side plate 5 is a finger 160, the free end 161 of which is turned upwardly behind the downturned portion of the key arm 156 and is adapted for contact by the screw 158. 162 designates a wire that connects the key arm 156 and finger 160 and is adapted for passing current therebetween.

In the case 1, at the rear, is a binding post 165, having a core 166 in conductive relation to the case. Also mounted on the rear of case 1 is a binding post 167, having a core 168 insulated from the case and connected with the circuit closer bracket 148 by a wire 169. With this construction it is apparent that when the key operating arm 137 is raised and the arm 156 is moved upwardly by the spring 161, the point 157 on the arm 156 will meet the point 155 on the arm 153 and a circuit will be closed so that current may flow from the wire 169 to the bracket 148, through arm 151, head 153, and point 155 to the point 157, on the arm 156 and thence through the wire 162, hanger 160, frame plate 5, boss 6 and pin 9 to the case body and through the case body to the post core 166.

While the transmitter will usually be operated from the typewriter keyboard, I have provided a manual sending key comprising a yielding contact arm 170 which is conductively mounted on case 1, a post 171 slidably mounted in a boss 172 on case 1 and operatively connected with the arm 170, and an insulated bracket 173 that is carried by the case 1 and connected with the binding post core 168 by a wire 174. It is apparent that when the manual key is used the circuit will be substantially the same as for the automatic keys.

For driving the elongated pinion 105, I prefer to utilize a spring motor 180, the shaft 181 of which is connected with the pinion by the speeding gears 182. Shaft 181 is provided with a ratchet winding mechanism 183 which may be of ordinary construction and for that reason is not illustrated in detail. Fixed to the crank pin 10 is a toothed segment 184 (Fig. III) that is adapted to mesh with the gear wheel 185 of the ratchet mechanism, so that when the crank is operated, the motor springs may be tensioned.

Adjacent to the pinion 105 is a governor mechanism for controlling the speed of the motor and comprising the following parts:— Revolubly mounted between the cone points 190 on the side plate 5 and bracket 191 respectively, (Figs. I and XXV), is a shaft 192, which is operatively connected with the pinion 105 by the gears 193. Revolubly mounted on shaft 192 is a sleeve 194, the outer end of which is adapted for abutment against the pins 196 that project laterally from the shaft, and has a longitudinal slot 197 through which the shaft pin 198 is projected. Sleeve 194 is also provided, at its outer end, with the wings 199, and at its opposite end with a disk 200. Pivotally mounted on the pins 196 are the governor hubs 201 having oppositely disposed arms 202 carrying weights 203.

Projecting inwardly from the hubs 201 are the pins 204 against which the sleeve wings 199 abut to limit the outward travel of the sleeve. 206 designates springs which connect the hubs 201 with the disk 200 and yieldingly retain the disk 200 against the outer end of one of the weights 203 and the wings 199 against the pins 204. In the adjacent frame side plate 5 is a bearing 207 within which a pin 208 is mounted for longitudinal movement in proximity to the disk 200. Fixed to the frame side 5 and extending through a slot 209 in pin 208 is a spring rod 210 that limits the travel of the pin and yieldingly retains same in its outward position.

Revolubly mounted in bearing 212 in the case 1 is a shaft 213 (Figs. I-XXV and XXVIII), having on its outer end a knurled knob 214 and a pointer 215, which latter is adapted for movement over an indicator plate 216 mounted on the side of the case. Rigid on the inner end of the shaft is a segment 217, having an inner cam face 218 adapted for engagement with the outer end of the pin 208, for the purpose of moving said pin inwardly toward the disk 200 to limit the outward movement of the disk, and consequently the speed of the governor.

The machine described may be connected with a telegraph line wire, but as the present invention is limited to the mechanical parts, I have not illustrated the line connections from the binding posts 165 and 167.

In using the transmitter, connection is made with the telegraph line wire, and the motor tensioned by means of its crank, it being understood that the pinion is constantly revolved by the motor when the governor lock is released. Presuming that it is desired to send a message in which the first word is "The", I will describe the operation of the transmitter for such word. First setting the governor so that the pinion 105 will revolve at the desired speed, the key for the letter T is struck, depressing the lever 21 against the tension of the spring 25. When the lever is depressed the trigger 85 is moved downwardly by the pin 90 which engages the trigger latch at the base of the slot 89. When the trigger is depressed the latch tooth 87 engages the rear tooth 78 of the controlling arm 67 and rocks same on its pivot, elevating the forward arm portion 70 against the tension of the spring 76. When the forward arm portion 70 is raised, its pin 74, which is projected into the front slot 60 of the character bar 55 lifts the front end of the character until the rib 61 is brought into position for entering the horizontal slot 48 between the shelf 52 and lip 52' of the relative plate tooth 47', when the front end of the character bar is raised, its rack 58, on its upper edge, meshes with the pinion 105, which latter is being revolved by the motor. As soon as the character has been elevated to position for engagement by the pinion, the head 95' of the trigger catch 95 will have passed under the latch plate 81 and will hold the trigger in its depressed position until tripped, so that as soon as the character bar has been "set" the key may be released without releasing the character bar from its engagement with the pinion.

When the character bar is raised, as described, its initial notch 57 receives the downturned end of the brush 134 that is adapted for coöperation with that particular bar, so that the brush, the beam 131 and the arm 137 all remain in their normal or inert positions. Immediately upon its coming into operative engagement with the pinion 105, the character bar is moved backwardly thereby against the tension of the spring 73, the slotted portions of the bar moving over the pins 64 and 74, so that the character bar is held yieldingly against the pinion by the arm 70, while being guided by said pins. As soon as the bar starts on its backward or inoperative travel, the rib 61 enters the groove between the shelf 52 and lip 52', so that its travel is steady and in a fixed plane.

When the character bar is moved backwardly until the inclined edge of the first character tooth engages the downturned end of the brush 134, the brush is raised and held in elevated position until the next notched portion of the character bar has come to position therebeneath, when it will drop into that notch, the beam 131 being rocked and the arm 137 elevated by the rocking of the brush, to relieve the arm 156 of the circuit closer, so that the arm 156 may be rocked by the spring 161 to bring the arm point 157 into contact with the head point 155. When the contact is made a circuit is closed through the post 168, wire 174, bracket 151, point 155, point 157, arm 156, wire 162, spring arm 161, frame plate 5, bearings 9 and 10 and case 1, to the post 166, and from the posts through the outside wires to the line wires, with which the transmitter may be connected, the distance between the notches in the character bar for the letter T, which is the first in the example word, being such that the circuit remains closed a sufficient length of time to record a telegraphic dash.

As the character bar moves backwardly, its rear end rocks the buffer 117 so that the gear wheel 120 in turning, moves the pitman 121 backwardly, drawing the front keeper plate 110 over the forward edges of all of the character bars except the one in actual operation, thereby preventing arms of the remaining bars from being raised into operative position, although a succeeding bar may be moved into a set or cumulative position in the following manner.

When a letter key is struck while a character bar is traveling with the pinion, its trigger is moved downwardly, depressing the rear tooth 78 of its controlling arm, until the latch head 95' is moved under the latch bar 81 by the spring 101. As the forward end of the character bar is held by the front keeper plate 110 it cannot rise in the ordinary manner, so the arm 70 is sprung, as shown in Fig. VII, and remains tensioned until the keeper 110 is removed.

When the first character bar has nearly reached the limit of its backward travel, the pin 63, that projects laterally from its side, engages the forward edge of the trigger latch 86 and moves the latch back against the catch arm 98, rocking the catch head from under the latch bar 81 and removing the latch hook 87 from the controlling arm hook 78. A slight backward movement of the character bar will then carry the rib 61 from its support on the shelf 52 of plate 47. As soon as the rib is removed from its support the spring 73 will draw the bar downwardly out of contact with the pinion and below the plane of the brush, at the same time drawing the bar forwardly to its rest position, the rib 61 traveling through the groove 50 in the guide plate 47. When the character bar is returned forwardly, the back buffer plate 117 is relieved of its holding pressure and the spring 124 moves the pitman forwardly and revolves the buffer 117 so that it follows the character bar. As the pitman is moved forwardly it moves the keeper plate 110 from its holding position over the character bars so that should the succeeding character bar be in set or cumulative position, it will be released immediately upon the removal of the keeper and will move into operative engagement with the driving pinion. If the succeeding character bar is not in cumulative position when the previous one is returned to first position, it will be thrown into engagement with the driving pinion immediately upon the actuation of the letter key.

The character bar for the letter "h", the second letter in the example word, is identical with the one described except that the teeth on its forward end are four in number and shorter than the tooth on the "T" character bar, so that the circuit will be closed intermittently for four short periods to indicate four telegraphic dots. The only difference in the character bar for the letter "e" is that this bar has a single short tooth to represent a telegraphic dot.

The operation of the parts for sending one of the letters given and for all letters or symbols, is the same. The only difference in the construction of the bars is in the number and length of the character teeth and the length of the ribs 61, and the location of the pins 63, which need only be of sufficient length to support the character bars in operative position while the transmission is being made.

It is apparent that character bars need not be limited to the letters of the alphabet, but that bars for numerals, symbols, spaces and the like may be provided.

Having thus described my invention, what I claim as new therein and desire to secure by Letters-Patent is:—

1. In a telegraph transmitter, a plurality of character members, a circuit making and breaking mechanism adapted for actuation by the character members, and means whereby parts may be set and retained in cumulative position while a previously released creating set is in operation and automatically released upon the completion of said operation.

2. In a telegraph transmitter, a plurality of individually operative character members, a driving mechanism, means for connecting the character members with the driving mechanism, a circuit making and breaking mechanism adapted for actuation by the character members, and means for restraining said connecting means while a character bar is in signal creating operation and for releasing same upon the completion of said operation.

3. In a telegraph transmitter, a plurality of character members and a driving mechanism therefor, means for connecting the character members with the driving mechanism, locking parts adapted for holding a succeeding member for a predetermined period relative to the operative travel of a preceding member, and circuit closing parts adapted for actuation by the character members.

4. In a telegraph transmitter, a plurality of character members and a driving mechanism therefor, setting levers adapted for moving said members into operative engagement with the driving mechanism, locking devices adapted for holding a succeeding member for a predetermined period relative to the operative travel of a preceding member and for automatically releasing same upon the expiration of such period.

5. In a telegraph transmitter, a plurality of character members and a driving mechanism therefor, setting levers adapted for moving said members into operative engagement with the driving mechanism, locking devices adapted for holding a succeeding member for a predetermined period relative to the operative travel of a preceeding member and for automatically releasing same upon the expiration of such period, and means for retracting said members to initial position.

6. In a telegraph transmitter, a plurality of individually operative character members, and a common driving mechanism therefor, a separate setting device for moving each of the character members into engagement with the driving mechanism, a locking device adapted for holding a succeedingly set member for a predetermined period relative to the operative travel of a preceding member, and means for automatically returning said members to initial position upon the completion of their operative travel, said locking mechanism being adapted for actuation from its holding position upon the return of a character member to initial position.

7. In a telegraph transmitter, a plurality of individually operative character members, and a common driving mechanism therefor, a separate setting device for moving each of the character members into engagement with the driving mechanism, and a locking mechanism adapted for actuation by an operative character member, said locking mechanism comprising a keeper whereby succeeding character members are held against engagement with the driving mechanism during the operative travel of the first member, and means for automatically retracting said keeper when the first character member leaves its operative engagement with the driving mechanism.

8. In a telegraph transmitter, a plurality of individual character members, yielding means for normally retaining said members in inoperative position, a driving mechanism adapted for engagement by said character members and for inducing travel thereof against the tension of said yielding means, a locking mechanism normally, yieldingly retained out of locking position and adapted for positive actuation by an operating character member, and setting devices whereby the normally inert character members are moved into engagement with the driving mechanism, the character members and locking mechanism being adapted for automatic return to initial position when freed from their positively actuating parts.

9. In a telegraph transmitter, a plurality of individual, normally inert character members; a common driving mechanism located adjacent to and adapted for actuating the character members when the latter are moved into engagement therewith; a separate setting device for each character member, comprising an elevating lever having variable connection with its character member, a key lever, and a trigger connecting the key and elevating lever and adapted for retaining the elevating lever in a predetermined position during the operating travel of the character member; and means for automatically returning the character member to initial position when it has completed its operating travel.

10. In a telegraph transmitter, a driving mechanism, a slotted character bar, a pin extending through a slot in said bar and serving as a pivot upon which the bar may turn and as a guide for its longitudinal travel, a setting device having positive lateral and freely movable longitudinal connection with said bar, and circuit making and breaking parts adapted for actuation by said bar.

11. In a telegraph transmitter, a frame having a member provided with upper and lower slots, a driving mechanism, a character bar adapted for operative engagement with said driving mechanism, and means for returning said bar to initial position, said bar being provided with a laterally projecting rib adapted for travel in one of said slots during its driven travel and for return through the other slot, substantially as set forth.

12. In a telegraph transmitter, a driving mechanism, a character bar slotted longitudinally, a pivot pin extending through a slot in said bar, a controlling arm having a pin extended into a slot in said bar, means for rocking said controlling arm, a trigger adapted for retaining said controlling arm in its rocked position, a pin on said bar adapted for tripping engagement with said trigger, means for automatically returning the bar to initial position, and circuit making and breaking parts adapted for actuation by said bar.

13. In a telegraph transmitter, a driving mechanism, a character bar having a forward and rear longitudinal slot, a fixed pin extending through the rear slot in said bar and serving as a pivot upon which the bar may turn and as a guide for its longitudinal travel, a controlling arm having a pin projected into the forward slot in said bar, means for rocking said controlling arm, a trigger adapted for retaining said arm in its rocked position, a pin on said bar adapted for releasing engagement with said trigger, a spring whereby said arm is returned to initial position, and circuit making and breaking parts adapted for actuation by said bar.

14. In a telegraph transmitter, a power driven elongated pinion, circuit making and breaking parts, a character bar having a rack and character teeth on the same longitudinal edge, a setting device whereby said bar is raised to bring its rack into mesh with the driving pinion and the character teeth into actuating relation to the circuit making and breaking parts, and means for automatically lowering the bar and returning same to initial position when it has completed its predetermined travel.

15. In a telegraph transmitter, a power driven elongated pinion, circuit making and breaking parts, a character bar having a rack and character teeth on the same longitudinal edge, a setting device whereby said bar is raised to bring its rack into mesh with the driving pinion and the character teeth into actuating relation to the circuit making and breaking parts and for retaining said bar in that position for a predetermined travel of the bar, and means for automatically lowering the bar and returning same to initial position when it has completed its predetermined travel.

16. In a telegraph transmitter, an elongated pinion, circuit making and breaking parts; a character bar having a rack and character teeth on the same longitudinal edge, a setting device whereby said bar is raised to bring its rack into mesh with the pinion and the character teeth into actuating relation to the circuit making and breaking parts, a guide member having upper and lower grooves, and a spring adapted for returning the character bar to initial position, the character bar being provided with a laterally projecting rib that is adapted to travel in the upper guide groove and support the character bar during its driven travel and for return through the lower guide groove, substantially as set forth.

17. In a telegraph transmitter, a driving mechanism; a normally inert character bar adapted for operative engagement with said driving mechanism; circuit making and breaking parts adapted for actuation by said bar; a permanent latch plate; a setting mechanism comprising a lever, having an arm operatively connected with the character bar, and a trigger engaging tooth, a trigger adapted for engagement with said tooth and having a catch member pivoted thereto and adapted for engagement with said latch plate, means for tensioning said trigger toward the trigger engaging tooth and latch plate, and a key lever adapted for actuating said trigger; a pin on said character bar adapted for engaging said trigger, and means for automtically returning said character bar to its initial position when released from the driving mechanism.

18. In a telegraph transmitter, a driving mechanism, a normally inert character bar adapted for operative engagement with said driving mechanism, circuit making and breaking parts adapted for actuation by said character bar, a setting mechanism comprising a lever having an arm operatively connected with said character bar and provided with a spring engaging member, a spring engaging said member and normally, yieldingly retaining said bar in inoperative position, and means for rocking said lever against the tension of said spring.

19. In a telegraph transmitter, the combination of a character bar having a laterally projecting pin, means for actuating said bar, a controlling arm having sliding connection with the character bar and having a trigger tooth, a latch plate extending transversely across the machine, a letter key lever, having a laterally projecting pin; a trigger latch having a slot into which the key lever pin is projected and having a latch tooth and an upwardly projecting body; a trigger catch having its lower end pivotally connected with the trigger latch, a latch head and an offset post; and springs yieldingly supporting the key lever and retaining the trigger parts toward their locking positions, substantially as and for the purpose set forth.

20. In a telegraph transmitter, a slotted carrying frame, an individual character bar adapted for vertical and longitudinal movement in each of the slots in said frame, a common driving mechanism for all of said character bars, a setting device for each character bar, and circuit making and breaking parts adapted for actuation by said bars.

21. In a telegraph transmitter, a driving mechanism, a plurality of character bars each adapted for operative engagement with said driving mechanism, means for rocking said bars, a sliding pitman, having a gear rack, a revoluble shaft having a gear in mesh with the pitman rack, a buffer plate rigid on said shaft and adapted for actuation by said character bars, a keeper plate adapted for movement over said bars, means on said pitman for actuating said keeper plate, and circuit making and breaking parts adapted for actuation by said character bars.

22. In a telegraph transmitter, a plurality of character bars, each adapted for individual operation, a pitman, a buffer plate adapted for actuation by said character bars, keeper parts movable with said pitman and adapted for holding the character bars with which it may contact, means for actuating said character bars, and circuit making and breaking parts adapted for actuation by said character bars.

23. In a telegraph transmitter, a plurality of character bars, each adapted for individual operation, a pitman adapted for positive actuation by a moving character bar and for automatic return to initial position, means connected with said pitman for locking subsequently set bars, motor driven means for actuating said character bars, and circuit making and breaking parts adapted for actuation by said bars.

24. In a telegraph transmitter, character bars adapted for individual operation, a pitman having plate embracing pins at one end, a buffer plate adapted for actuation by said character bars and operatively connected with said pitman, a keeper plate revolubly mounted and adapted for movement over said character bars and for actuation by the pins on said pitman, a spring connected with said pitman and adapted for returning same to initial position after an actuation by said buffer plate, means for operating said bars, and circuit making and breaking parts adapted for actuation by said bars.

25. In a telegraph transmitter, character bars adapted for individual operation and each provided with character teeth; a driving mechanism for actuating said character bars; and circuit making and breaking parts comprising a key arm, a pivoted beam having an arm adapted for engagement with the key arm, and a brush projecting from the beam and adapted for contact with the character bar teeth; and means for raising said character bars into position for engaging the driving mechanism and brush.

26. In a telegraph transmitter, character bars adapted for individual operation and each provided with character teeth and with an initial receiving notch, means for actuating said character bars, and circuit making and breaking parts comprising a key arm, a pivoted beam having an arm adapted for contact with said key arm, a brush projecting from said beam and adapted for projection into the initial notches in said character bars and for contact with said character teeth, and means for raising said character bars into position for engaging the driving mechanism and brush.

27. In a telegraph transmitter, the combination of a plurality of character members adapted for individual operation and each provided with character teeth; means for actuating said character members, a stationary key point, a movable key arm, means for yieldingly tensioning the arm toward the point, a pivotally movable member having an arm overlying the key arm and normally depressing the same against the tension of said yielding means, and means carried by said pivotally movable member and adapted for engagement with the character member, for the purpose set forth.

28. In a telegraph transmitter, the combination of a plurality of character members, means for actuating said members, a stationary key point, a movable arm adapted for contact with said point, a spring tensioning the arm toward the point, a pivoted member having an arm overlying the key arm, and means on said member adapted for actuation by the character members to rock the pivoted member and overlying arm.

29. In a telegraph transmitter, the combination of a plurality of character members, means for actuating said members, a key point; a key arm adapted for contact with said point; and a longitudinally pivoted beam having an arm connected with the key arm, having brushes adapted for separate engagement with relative character members, and having means for regulating the tension of each brush independently of the others.

30. In a telegraph transmitter, the combination of a plurality of character members, means for actuating said members, a key point, a movable arm adapted for contact with said point, a longitudinally pivoted beam having a shelf, an arm fixed on said beam and adapted for actuating said key arm, brushes fixed on said beam and adapted for actuation by the character members, and screws, carried by said shelf and adapted for adjusting the tension of said brushes, substantially as and for the purpose set forth.

31. In a telegraph transmitter, the combination of a plurality of character members, means for actuating said members, a key bracket having a head, a key point carried by said head, a key arm axially mounted in said bracket and adapted for contact with said point, a spring carried by the bracket and yieldingly tensioning the key arm toward the point, a screw carried by said arm and adapted for regulating the movement of said arm, and a controlling member having connection with the key arm and adapted for actuation by the character members for the purpose set forth.

32. In a telegraph transmitter, the combination of a plurality of character members, means for actuating said members, a bracket, a key point carried by the bracket, a key arm axially mounted on, but insulated from the bracket, a spring carried by, but insulated from the bracket and adapted for tensioning the arm to a contact with the point, a controlling member having an arm connected with the key arm and retaining same out of contact with the point against the tension of said spring, and means on said controlling member adapted for actuation by a character member and for lifting the controlling member arm, when so actuated, for the purpose set forth.

33. In a telegraph transmitter, the combination of a plurality of character members, means for actuating said members, a bracket, a key point carried by the bracket, a key arm having laterally projecting pins pivotally mounted in said bracket and provided with a depending flange, a flat spring carried by the bracket and engaging said arm flange, a beam pivotally mounted, and having an arm overlying the key arm, and a plate having members adapted for individual contact with said character devices, substantially as and for the purpose set forth.

34. The combination with a suitable frame of a plurality of character members mounted in said frame, means for actuating said members, a bracket carried by, but insulated from said frame, a key point carried by the bracket, a key arm pivotally mounted on and insulated from the bracket, a flat spring carried on and insulated from the bracket and adapted for tensioning the key arm toward its point, means for regulating the movement of said arm, a pivotally mounted beam having an arm overlying the key arm, a plate secured to said beam and having a slotted free edge forming brushes adapted for individual contact with separate character members, and means for regulating the tension of each of said brushes independently of the others.

35. In a telegraph transmitter, a plurality of individually operative character members; a circuit closer comprising a stationary key, a movable key member a rocking beam having an individual brush for each character member, means for adjusting each brush independently of the others, a single contact member on said beam adapted for engagement with the movable key member when the beam is actuated, and means for actuating said character members.

36. In a telegraph transmitter, a plurality of individually operative character members; a circuit closer comprising a stationary key, a movable key member a rocking beam having an individual brush for each character member, set screws adapted for adjusting the tension of each brush independently of the others, and an arm on said beam for controlling said movable key member.

37. In a telegraph transmitter, the combination of a plurality of character members, means for actuating said members, a stationary key point, an arm movable toward and from said point, a pivotally mounted beam having an arm connected with the key arm, and having means adapted for actuation by the character members, a bracket located adjacent to said beam, pins carried by said bracket, springs surrounding said pins and projected beyond the free ends thereof, and a post carried by said beam and projecting between said pins, substantially as and for the purpose set forth.

38. In a telegraph transmitter, the combination of a plurality of character members, means for actuating said members, a circuit key point, an arm movable toward and from said point, a pivotally mounted beam, having an arm adapted to contact the key arm, and having means adapted for actuation by the character members, a buffer bracket located adjacent to said beam, pins carried by said bracket, springs surrounding said pins and projected beyond the free ends thereof, a lip carried by said beam and projected between the buffer pins, and posts carried by said lip and projecting into said springs, substantially as and for the purpose set forth.

39. In a telegraph transmitter, a plurality of individually operative character bars, a driving mechanism, a setting device comprising key levers and means connecting same with character bars, keepers hung between said key levers and adapted for pivotal movement transversely to said levers, and provided with plates adapted for edge contact and having beveled upper edges adapted for engagement by said key levers, and circuit making and breaking parts adapted for actuation by said character bars.

40. In a telegraph transmitter, a slotted frame; character bars, mounted on said frame: a driving mechanism; a slotted plate, carried by said frame; a bar carried by said plate and provided with circular sockets, having downwardly opening beveled necks; pendulum members comprising rounded heads that are seated in said sockets, shanks, and keeper plates, having beveled upper edges; and key levers, pivoted in said frame and extending through said slotted plate and between the pendulum shanks above the keeper plates, substantially as and for the purpose set forth.

41. In a telegraph transmitter, the combination of a case, having apertures at opposite sides, a frame having a socketed boss at one side and shaft bearings at the opposite side, a pivot stud extending through the case apertures into the socket in said boss, a crank pin extending through the other aperture and mounted in the frame bearings, a crank fixed to said pin on the outside of said case, a segmental gear fixed to said pin, within the case, a spring motor located within the case and having a shaft mounted in said frame, ratchet connection between the shaft and segmental gear, an elongated pinion revolubly mounted in said frame and having operative connection with the motor, a plurality of character members located in said frame and adapted for operative engagement with the pinion, means for setting said character members, and a circuit making and breaking mechanism adapted for actuation by the character members.

42. In a telegraph transmitter, the combination of an inclosing case, a frame pivotally mounted within the case, means for attaching the frame to the case, character members carried in the frame, means for actuating the character members, and a circuit making and breaking mechanism adapted for actuation by the character members.

43. In a telegraph transmitter, an inclosing case, a frame located within said case, character members carried by the frame, means for setting the character members, an elongated pinion adapted for driving engagement with said character members, means for actuating said pinion, a governor mechanism connected with said pinion and comprising a laterally movable disk, governor weights having hub members adapted for moving the disk, a spring adapted for tensioning the disk toward the hub members, a pin slidably mounted in said frame and adapted for frictional engagement with said disk, a spring adapted for tensioning the pin away from the disk, a cam shaft mounted in said case, a cam carried by said shaft and adapted for engaging said pin, and means on the outer end of said shaft for turning same.

In testimony whereof I affix my signature in presence of two witnesses.

BENJAMIN P. HAYES.

Witnesses:
EDWIN H. PETERSON,
C. D. WELLMAN.